Jan. 9, 1945.  F. E. SMITH  2,366,814
HOSE COUPLING
Filed March 29, 1943  4 Sheets-Sheet 1

INVENTOR.
Franklin Elijah Smith
BY
Haseltine, Lake & Co.
ATTORNEYS

Jan. 9, 1945.   F. E. SMITH   2,366,814
HOSE COUPLING
Filed March 29, 1943   4 Sheets-Sheet 2

INVENTOR.
Franklin Elijah Smith
BY
Haseltine, Lake & Co.
ATTORNEYS

Jan. 9, 1945.   F. E. SMITH   2,366,814
HOSE COUPLING
Filed March 29, 1943   4 Sheets-Sheet 3

INVENTOR.
Franklin Elijah Smith
BY
Haseltine, Lake & Co.
ATTORNEYS

Jan. 9, 1945. F. E. SMITH 2,366,814
HOSE COUPLING
Filed March 29, 1943 4 Sheets-Sheet 4
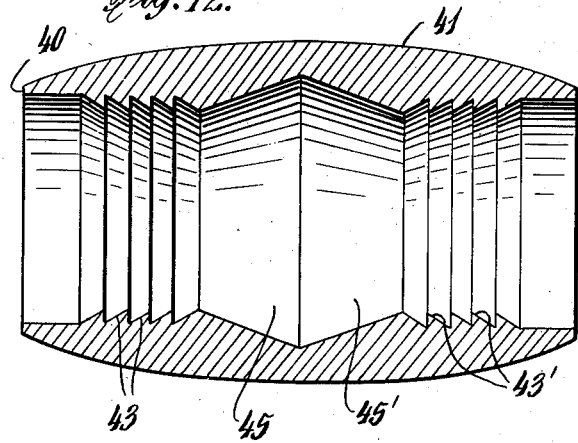
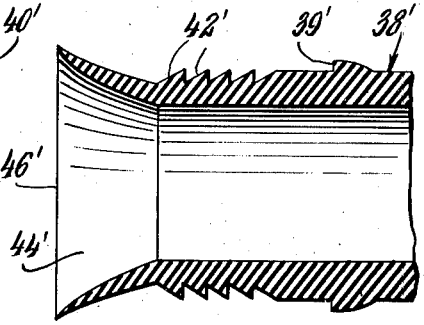
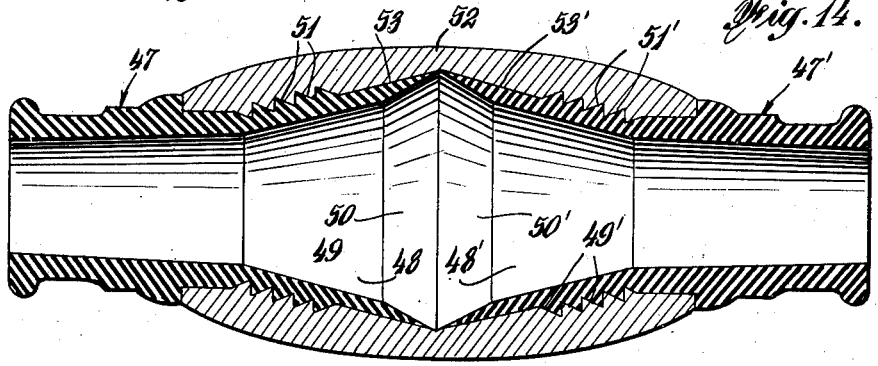
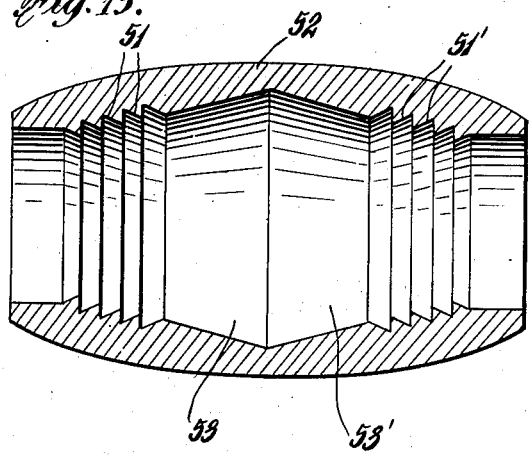
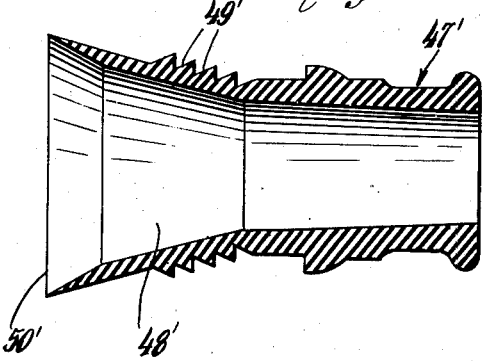
INVENTOR.
Franklin Elijah Smith
BY
Haseltine, Lake & Co
ATTORNEYS Patented Jan. 9, 1945

2,366,814

UNITED STATES PATENT OFFICE 2,366,814

HOSE COUPLING

Franklin Elijah Smith, South Dartmouth, Mass.

Application March 29, 1943, Serial No. 480,891

12 Claims. (Cl. 285—71)

This invention relates to hose couplings and the like, particularly characterized by the fact that a resiliently collapsible spigot member forming part of the coupling is capable of being inserted into a more or less rigid sleeve or shell member of the same coupling and within said sleeve or shell allowed to resume its original shape in which it becomes engaged and interlocked with the sleeve or shell.

One object of my invention is to have a coupling of this character which may be very quickly and conveniently connected and disconnected at will.

Another object of my invention is to have a coupling in which the sleeve or shell is adapted to receive the collapsible spigot member at each of its two ends.

A further object is to provide a spigot member with a thin edge at the end thereof which is sensitive to the pressure of the fluid passing through the spigot member in order to bring said edge into intimate contact with the corresponding portion of another spigot member or a substantially smooth wall portion of the sleeve in order to insure fluid tightness of the coupling.

It is also an object to have a coupling of the indicated character which is capable of being made in a series of different forms, all based on the same general principles.

It is, of course, an important object above all to have a coupling which consists of as few parts as possible and of such simple form that nothing concerning said coupling can possibly get out of order so that the coupling may virtually be stated to be fool-proof and one moreover which is equally effective for fluid flow therethrough in either direction.

Other objects and various advantages inherent in the invention and resulting from its practical application in the art will become apparent as this specification proceeds.

With the foregoing objects in view and in order to provide an exceedingly and convenient coupling which is quick to manipulate and simple to use, the present invention is illustrated in the accompanying drawings, forming part hereof, to facilitate comprehension of its salient features.

In said drawings,

Figure 12 is a similar section of the outer sleeve of the coupling of Figure 11, while Figure 13 is a fragmentary longitudinal section of one of the spigot members of said Figure 11.

Figure 14 is also a still further modification based on the modification of Figure 11 and shown in longitudinal section.

Figure 15 is a section of the outer sleeve of the modification shown in Figure 14.

Figure 16 shows in section one of the two spigot members of the modified coupling of said Figure 14.

Throughout the views the same references indicate the same or like parts.

Many times when emergencies arise as in earthquakes, fires and during time of war, in dangerous conditions connected with or resulting from bombing and air raids by enemies, it is frequently necessary to lay hose for considerable distance through streets and/or across fields, etc. in order to replace broken water mains or to bring water to some outlying district at great speed so as to meet the emergency and mitigate damage and reduce fire loss to a minimum. Conventional couplings are not always suitable because coupling fixtures have often been unwieldy and more or less inconvenient to use and hence the present invention has been designed to embody the foregoing characteristics and objects while avoiding the several mentioned disadvantages in a very direct and practical manner.

Figure 1:
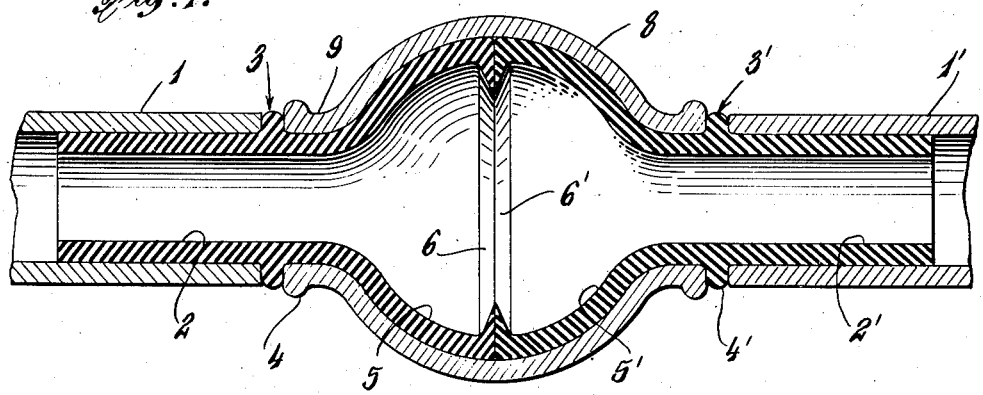
Figure 1 is a longitudinal section through a coupling made according to the invention and embodying certain advantageous features of the same.

Thus, in Figure 1, a hose 1 is secured by cementing or by other means known in the art to the shank 2 of a spigot member generally indicated at 3 and preferably made of a resilient material of the class consisting of rubber, whether natural or artificial, the resilient plastic called "Neoprene," the vinyl plastics and derivatives and other resilient and flexible bodies known or which may be discovered, the main point being that the spigot should be of such resilient character that if collapsed into a small compass, it will, when released again, assume its original shape by immediately expanding to its full form.

While the hose in the several views has been shown as exteriorly fitting the coupling it will be understood that equally it may be connected interiorly thereof or if desired the spigot members of the coupling may be made integral with the hose.

The mentioned spigot 3 has a stop or flange 4 on the shank 2 thereof while on the other side of the flange 4 the spigot enlarges into hollow hemispherical portion 5 which terminates in beveled lip portion or converging flange 6 which exteriorly is nearly flat at 7 for a purpose which will immediately appear. A similar spigot 3' having a shank connected to a hose 1', as in the case of spigot 3, is also provided with a hollow hemispherical portion 5' terminating in a beveled lip 6. In order to connect these two spigot members, I prefer to provide a more or less spherical hollow shell 8 with open ends 9, 9' and capable of receiving the hemispherical portions 5, 5' of spigots 3, 3' within the same by first collapsing, in any convenient manner, the hemispherical portion 5 of spigot 3 to sufficiently small collapsed or folded form to pass through open end 9 of the shell 8, and allowing said hemispherical portion to resume its original hemispherical form by expanding into shape within shell 8 when the flange or stop 4 meets with the end 9 of said shell. In similar fashion, the spigot 3' is inserted so that the entire coupling in assembled condition will appear as substantially shown in Figure 1.

Figure 2:
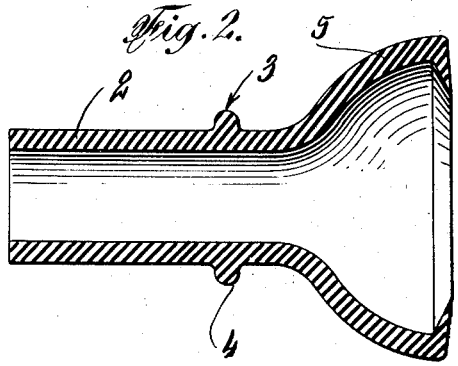
Figure 2 is a similar section of the resiliently collapsible spigot member of the coupling of Figure 1.
Figure 3:
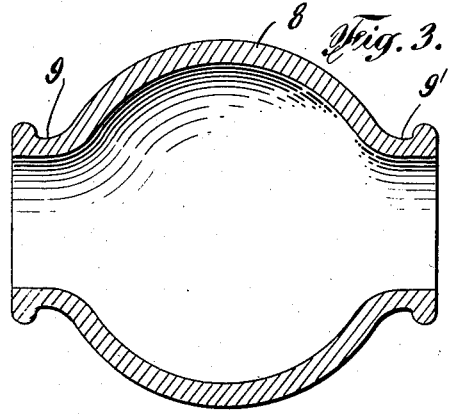
Figure 3 is a longitudinal section of the rigid exterior sleeve of the same coupling.

In order to make certain that an absolutely fluid tight joint is made, the beveled lip or edge portions 6, 6' of the two spigot members are initially caused to project slightly in convex manner so that when both the outer portions 7 thereof meet, the thinner edge portions will first meet and then the entire outer surfaces of said lip portions will be in actual contact when the spigot members are fully seated within the shell 8. The result is that when fluid under pressure fills the spigots, the pressure exerted by the fluid will bend the nearest edge 6 or 6' (dependent on the direction of flow) towards the inner surface of the spigot and the other edge of the complementary spigot member will also be bent in the same direction and overlap said first named edge and be in firm contact therewith so that a doubled-over fluid tight joint will be obtained and the pressure will keep the knife-edge or lip portions in contact virtually forming a seal for the fluid, the shell never coming into actual contact with the fluid. Figures 2 and 3 show one of the spigots and the shell disassembled, the shell being preferably made of some unyielding material such as any suitable metal alloy, hard plastic of any description, wood, ceramics, glass, or any rigid material which may be cut, shaped or molded to form.

Figure 4:
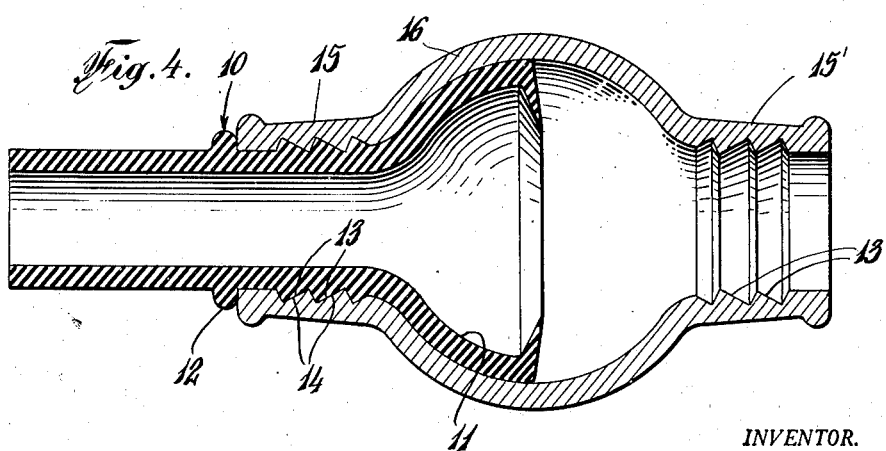
Figure 4 illustrates, in section, a modification having one spigot removed to disclose the structural detail.
Figure 5:
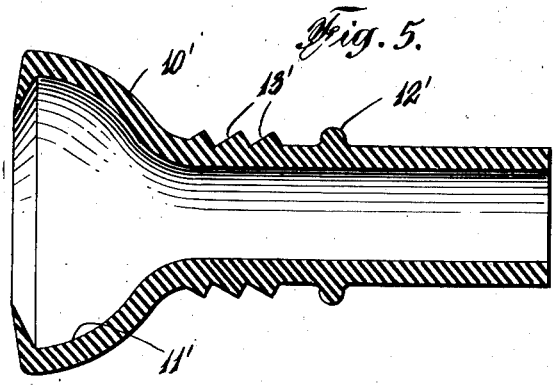
Figure 5 is a section showing a spigot alone of the last mentioned coupling.

In Figure 4 the spigot 10 is generally of the same shape and nature as spigot 3 of Figure 1 except that between the hemispherical portion 11 and the stop or flange 12 the length of the spigot has been increased and a group of one-way teeth 13 have been provided to engage in corresponding grooves 14, 14' in the end portion 15 of shell 16. The other end portions 15' is, of course, similarly formed within while the corresponding spigot member 10' shown in Figure 5 is substantially identical with spigot 10 in every particular, shell 16 being preferably of rigid material while the spigots 10 and 10' are of resilient or at least flexible material as indicated with respect to the spigots 3 and 3'.

Figure 7:
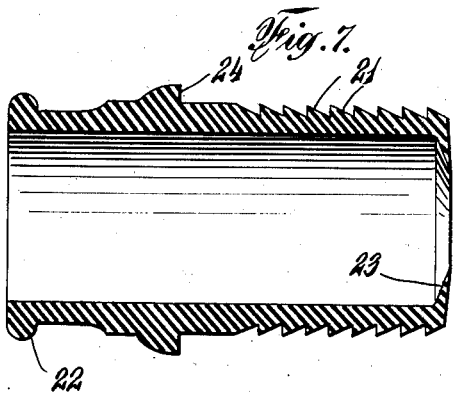
Figure 7 is a sectional view of a spigot member alone of the coupling of Figure 6.
Figure 6:
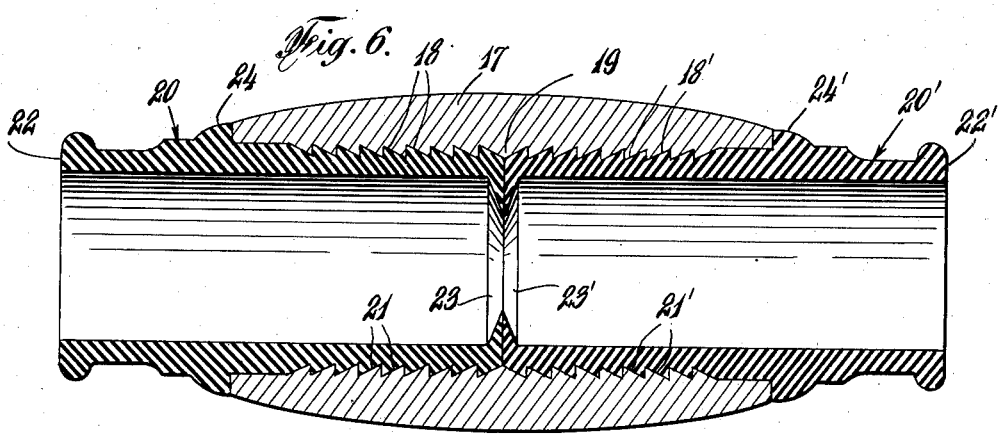
Figure 6 illustrates a different modification in longitudinal section.
Figure 8:
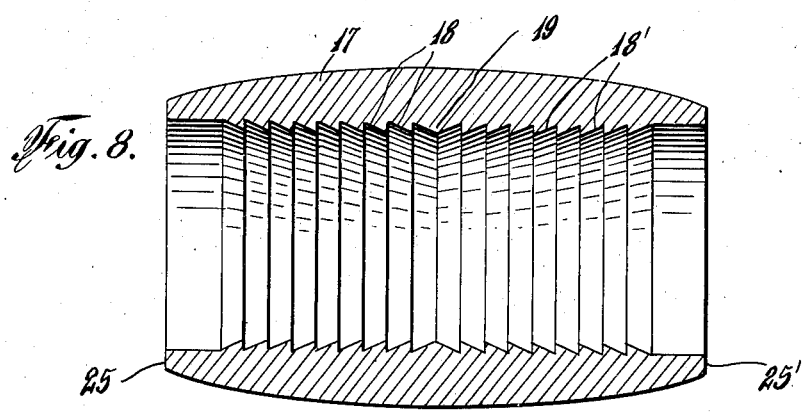
Figure 8 is a similar section of the outer sleeve of the same coupling.

Digressing temporarily from the form of spigot and shell or sleeve wherein the inner ends of the spigot are of greater diameter than their shanks and the shell correspondingly enlarged intermediately, the forms of couplings shown in Figures 6 through 10 involve a more or less straight and streamlined sleeve with straight spigots of substantially uniform interior diameter. Thus, in Figure 6 the exteriorly streamlined shell or sleeve 17 is provided symmetrically with two opposite sets of one-way teeth or grooves 18, 18' having a large double tooth or rib 19 disposed in the center of the sleeve between the two groups. Two resiliently collapsible spigots 20, 20' are provided on their inner ends with series of ribs or teeth 21, 21' corresponding and engaging with the grooves 18, 18' respectively of sleeve 17 when assembled therewith while the outer ends 22, 22' of said spigots may be secured to piping or hose in any desired manner, this feature forming no actual part of the present invention. The inner ends of the spigots terminate in the knife-edge portions 23, 23' which engage against each other in the same manner as described with respect to knife edges 6 and 6' of Figures 1 and 2, while the spigots have stops 24, 24' abutting the ends 25, 25' of the sleeve. In Figure 7 one spigot alone is shown while Figure 8 shows the sleeve when freed from the spigots, it being quite evident that it is only necessary to collapse or partially collapse the ribbed portion of the spigot in order to introduce the same into sleeve 17.

Figure 9:
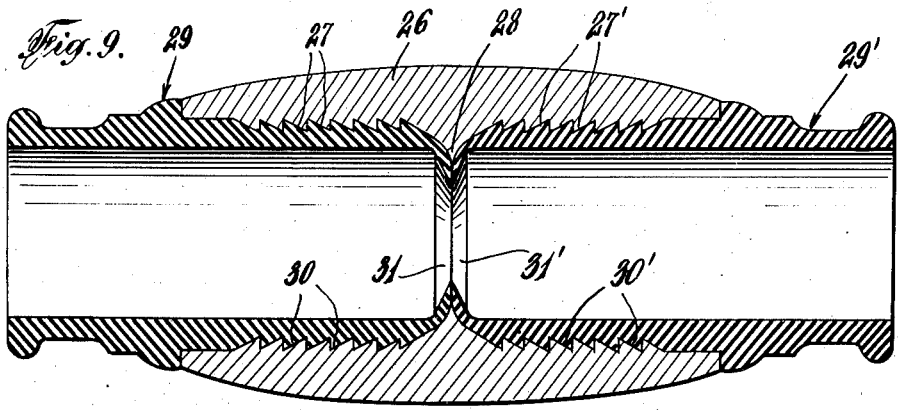
Figure 9 is a longitudinal section of yet another modification largely resembling the modification of Figure 6.

In Figure 9 the sleeve 26 has a similar pair of symmetrically arranged opposite groups of one-way teeth or grooves 27, 27' resembling the grooves 18, 18' in sleeve 17, while in this case a very large, projecting rib or the like 28 separates the two groups. The spigots 29, 29' naturally have corresponding series of ribs or teeth 30, 30' engaging in the grooves 27, 27' of the sleeve, but due to the enlarged character of the central rib 28, the knife-edge portions 31, 31' are tapered or thinned off a further distance along the inner ends of the spigot members so as to render said knife-edge portions more flexible and sensitive to fluid pressure and thereby increasing the likelihood of cooperation between said edges to form a fluid seal.

Figure 10:
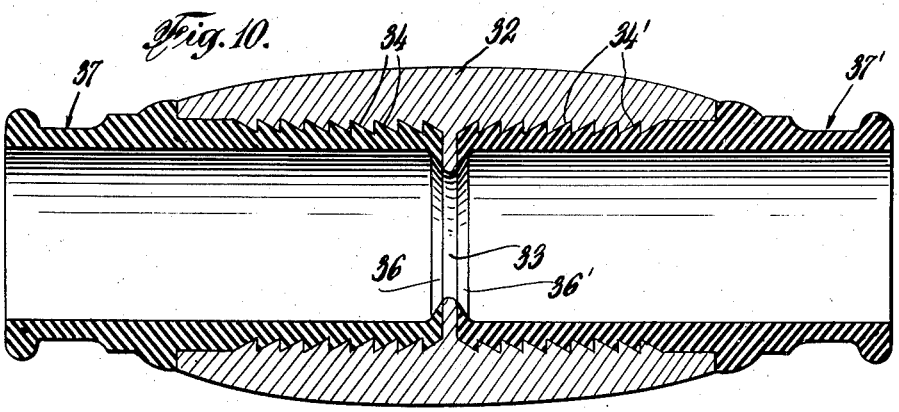
Figure 10 is likewise another modification for the most part similar to that of Figure 6.

Figure 10 illustrates another modification with respect to the central rib or tooth but in this case the sleeve 32 has a central flange 33 dividing the two groups of one-way teeth or grooves 34, 34' while the knife-edge portions 36, 36' of the inner ends of the spigots 37, 37' engage directly against the sides of said flange 33 instead of against each other. In other respects the sleeve and the spigots generally resemble the sleeve and spigots of Figures 6 through 8.

Returning now to the concept of enlarging at least a portion of the inner end of each spigot to fit an interiorly enlarged or expanded portion of a sleeve or shell, Figures 11 through 16 illustrate several examples thereof.

Figure 11:
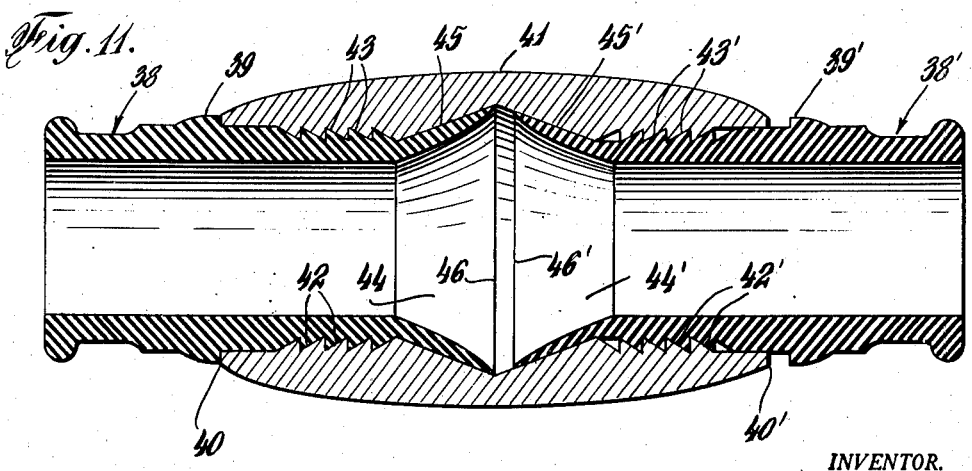
Figure 11 is a further modification shown in longitudinal section, in which one of the two spigots shown is partly withdrawn.

In Figure 11 the spigots 38, 38' have the previously illustrated stops 39, 39' normally abutting the ends 40, 40' of the sleeve 41 while in each case a series of one-way ribs or teeth 42, 42' upon the spigots normally engage in corresponding grooves 43, 43' in the sleeve.

However, upon the inner ends of the spigots are formed flaring or bell portions 44, 44' normally seating in correspondingly enlarged portions 45, 45' which are generally conical within sleeve 41. The extreme edges 46, 46' of the flaring portions 44, 44' of the spigots are beveled down to form very thin extremities which will readily be pressed against the wall 45, 45' so as to make intimate contact therewith, these edges when free being flared sufficiently to be crowded or confined by said walls when the spigots are in place within the sleeve or shell.

Figure 12 shows more clearly the frusto-conical form of each of the hollow portions 45, 45' in sleeve or shell 42, while in Figure 13 it is quite obvious that the thin edge portion 46' of the spigot bell 44' is flared out in exaggerated manner to ensure intimate contact of the edge 46' with the wall portion 45' of said sleeve. If an excessive tension or pull is exerted on the spigot 39', for example, especially before internal fluid pressure of flowing liquid within the spigot tends to hold it in place in sleeve 41, the spigot may jump a tooth or groove and then become seated in the remaining grooves 43' of the sleeve. Even in such displaced position of the spigot, the flaring bell portion 44' will make intimate contact with the wall of hollow portion 45' in the sleeve, and this is equally true of the thin edge 46' which will emphatically engage against the wall because the diameter of said hollow portion decreases and crowds said edge together more and more as the spigot is withdrawn from within the sleeve.

It is, of course, possible to have a larger portion of the spigot formed into a flaring bell, as for example, in Figure 14, in which the spigots 47, 47' have the bell portions 48, 48' flaring even where the one-way teeth or ridges 49, 49' are located exteriorly, while the inner ends 50, 50' are beveled down to thin, pressure-sensitive edges at the maximum diameter. The grooves 51, 51' together with the hollow frusto-conical portions 53, 53' receive the ribs or ridges 49, 49' and the entire exterior of the bell portions 48, 48' as well as of the bevel portions 50, 50' of both spigots. It is easily seen that the progressively increased diameters of the ridges inwardly and of the bell in each case will tend to retain each spigot seated in position and prevent displacement thereof when once properly inserted in place. The details are somewhat further clarified in the sleeve or shell 52 shown in Figure 15 and in the spigot 47' shown in Figure 16. The details which are not specifically referred to upon the exterior of the spigots which resemble corresponding described detail of the former figures serve similar purposes and hardly merit repetition here.

It is to be noted that in each form of the invention certain main principles prevail, for in each case a rigid sleeve or shell is involved having interior retaining means (ribs or grooves) and perhaps also an expanded hollow interior, while at least one spigot of resilient or collapsible character has ribs or ridges engaging with the ribs or grooves of the sleeve, and also has optionally a bell shaped inner end engaging in the hollow frusto-conical portion of the shell when the latter portion is included. Also, in substantially every case, the spigot at its inner extremity terminates in a beveled or thin pressure sensitive edge for engaging or lying against another part of the coupling or joint to form a fluid seal. In the first nine figures, the thin edges of the spigot members upon the inner extremities thereof are thus maintained in mutual contact by fluid pressure and tend to bend over in the direction of flow of this fluid through the coupling. In Figure 10 these inner spigot edges engage against the partition 33, as already mentioned, while in the remaining figures the inner edges lie directly against the wall of the sleeve or shell, but in every case the inner end of each spigot has the thin edge thereof made sufficiently flexible to be sensitive to fluid pressure so that the edges involved are held by the fluid in contact with corresponding edges of the opposite spigot or against some portion of the sleeve or shell.

Manifestly other specific forms than those now actually shown and described are possible to make and certain features may be used without others, with the scope of the invention as defined in the appended claims. Cross combinations of features herein are also plausible.

Having now fully described my invention, I claim:

1. A connector or coupling for pipe or hose including a rigid shell or sleeve having a plurality of undercut portions within the ends thereof forming grooves upon the interior of said sleeve, a central flange within said sleeve separating the grooves into two groups, said flange forming a converging ridge within the sleeve, and a pair of spigot members of resiliently collapsible material adapted to be inserted into both ends of said sleeve, each spigot member having a group of ribs or ridges thereon for engaging in the grooves of the sleeve and having upon the inner end a thin converging edge portion or flange adapted to be held against the corresponding flange of the other spigot member by fluid pressure so as to form a fluid seal.

2. A connector or coupling for pipe or hose including a rigid shell of substantially spherical form with two open ends projecting therefrom, a pair of spigot members of resiliently collapsible material adapted to be inserted into the ends of said shell so as to make mutual contact within the maximum diameter thereof, each spigot member having a shank upon one end for attachment to a hose or pipe and at the other end an enlarged hemispherical portion terminating in a converging thin lip or flange adapted to engage directly against the corresponding lip or flange of the other spigot member when the enlarged hemispherical ends of both spigot members are seated in place within said shell.

3. A connector or coupling according to claim 2 including a plurality of ribs or ridges encircling the shank of each spigot member and adapted to seat in corresponding grooves within the open ends of the shell.

4. A connector or coupling for pipe or hose including a rigid shell or sleeve having a plurality of undercut portions within the ends thereof forming grooves upon the interior of said sleeve, an enlarged frusto-conical intermediate hollow portion within the shell having the maximum diameter at the mutually adjacent portions of the frusto-conical hollow portions, and a pair of resiliently collapsible spigot members adapted to be inserted into said shell through the ends thereof, each spigot member having at one end a shank adapted for attachment to a hose or pipe, a plurality of intermediately located ribs or ridges for engaging the grooves within the ends of said sleeve and upon the other end a flaring frusto-conical portion terminating in a thin edge or flange and adapted to fit within one of the frusto-conical portions within said shell.

5. A connector or coupling for pipe or hose including a rigid shell of elongated form having open ends and within the same a pair of frusto-conical hollow portions mutually meeting at their maximum diameters intermediate the ends of said shell, a plurality of groove portions within the ends of the shell located at the outer extremities of said frusto-conical hollow portions, and a pair of resiliently collapsible spigot members adapted for insertion into the ends of said shell, each spigot member including at one end a shank portion adapted for attachment to pipe or hose and at the other end having a flaring frusto-conical portion provided adjacent the intermediate portion of the spigot member with a plurality of ribs or ridges adapted to seat and engage in the groove portions within the ends of the shell, the flaring frusto-conical portion terminating in a thin lip or flange and being adapted to fit within one of the frusto-conical hollow portions of the shell.

6. A connector or coupling for pipe or hose comprising a rigid hollow shell or sleeve having two open ends, a pair of spigot members each having one extremity adapted for attachment to a pipe or hose end and the other extremity of resilient material capable of being collapsed by external pressure to permit it being inserted into said shell or sleeve and to resume its normal shape when said pressure is removed, said spigot members being formed at their inner edges with complementary flanges forming a fluid seal.

7. A connector or coupling for pipe or hose comprising a rigid hollow shell or sleeve having two open ends, a pair of spigot members each having one extremity adapted for attachment to a pipe or hose end and the other extremity of resilient material capable of being collapsed by external pressure to permit it being inserted into said shell or sleeve and to resume its normal shape when said pressure is removed, said spigot members meeting substantially centrally of said shell and being formed at their inner edges with complementary flanges forming a fluid seal.

8. A connector or coupling for pipe or hose comprising a rigid hollow shell or sleeve having two open ends, a pair or spigot members each having one extremity adapted for attachment to a pipe or hose end and the other extremity of resilient material capable of being collapsed by external pressure to permit it being inserted into said shell or sleeve and to resume its normal shape when said pressure is removed, said spigot members being formed at their inner edges with complementary inwardly directed thin flanges forming a fluid seal.

9. A connector or coupling for pipe or hose comprising a rigid hollow shell or sleeve having two open ends, a pair of spigot members each having one extremity adapted for attachment to a pipe or hose end and the other extremity of resilient material capable of being collapsed by external pressure to permit it being inserted into said shell or sleeve and to resume its normal shape when said pressure is removed, said spigot members meeting substantially centrally of said shell and being formed at their meeting edges with complementary inwardly directed thin flanges forming a fluid seal.

10. A connector or coupling for pipe or hose comprising a rigid hollow shell or sleeve having two open ends, a pair of spigot members each having one extremity adapted for attachment to a pipe or hose end and the other extremity of resilient material capable of being collapsed by external pressure to permit it being inserted into said shell or sleeve and to resume its normal shape when said pressure is removed, said spigot members being formed at their inner edges with complementary flanges forming a fluid seal, said shell having grooves cut in its interior face and said spigot members having exterior projections adapted to engage said grooves when the spigot members are inserted into and have assumed their normal shape in said shell.

11. A connector or coupling as claimed in claim 10 wherein said shell has a centrally located inwardly directed rib against which the said complementary flanges of the spigot members abut when the spigot members are in fully inserted position.

12. A connector or coupling for pipe or hose comprising a rigid hollow shell or sleeve having two open ends, a pair of spigot members each having one extremity adapted for attachment to a pipe or hose end and the other extremity of resilient material capable of being collapsed by external pressure to permit it being inserted into said shell or sleeve and to resume its normal shape when said pressure is removed, said spigot members meeting substantially centrally of said shell and having their meeting ends terminating in complementary outwardly flaring thin knife-edge flanges.

FRANKLIN ELIJAH SMITH.